United States Patent
Lim et al.

(10) Patent No.: US 10,446,142 B2
(45) Date of Patent: Oct. 15, 2019

(54) CRAFTING FEEDBACK DIALOGUE WITH A DIGITAL ASSISTANT

(71) Applicant: MICROSOFT TECHNOLOGY LICENSING, LLC, Redmond, WA (US)

(72) Inventors: Melissa Nicole Lim, Seattle, WA (US); Margaret Ann Mitchell, Seattle, WA (US); Christopher Brian Quirk, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 366 days.

(21) Appl. No.: 14/718,071

(22) Filed: May 20, 2015

(65) Prior Publication Data

US 2016/0342317 A1 Nov. 24, 2016

(51) Int. Cl.
| | | |
|---|---|---|
| *G06F 3/0484* | (2013.01) | |
| *G10L 15/22* | (2006.01) | |
| *G10L 15/18* | (2013.01) | |
| *G06F 17/27* | (2006.01) | |
| *G10L 15/06* | (2013.01) | |
| *G06Q 10/00* | (2012.01) | |

(52) U.S. Cl.
CPC .......... *G10L 15/22* (2013.01); *G06F 17/2785* (2013.01); *G10L 15/1822* (2013.01); *G06Q 10/00* (2013.01); *G10L 2015/0635* (2013.01); *G10L 2015/0638* (2013.01)

(58) Field of Classification Search
CPC ............. G06F 3/04847; G06F 17/2785; G10L 15/1822; G10L 15/22; G10L 2015/0635; G10L 2015/0638
See application file for complete search history.

(56) References Cited

U.S. PATENT DOCUMENTS

| | | | |
|---|---|---|---|
| 7,216,080 B2 | 5/2007 | Tsiao et al. | |
| 7,319,992 B2 * | 1/2008 | Gaos ...................... | G06Q 30/02 348/E7.05 |
| 7,493,264 B1 * | 2/2009 | Kelly ..................... | G06Q 10/06 705/2 |
| 7,725,419 B2 | 5/2010 | Lee et al. | |

(Continued)

FOREIGN PATENT DOCUMENTS

WO 2014142702 A1 9/2004

OTHER PUBLICATIONS

2002 Galitz the essential guide to user design.*

(Continued)

*Primary Examiner* — Jung-Mu T Chuang

(57) ABSTRACT

Examples described herein dynamically personalize a digital assistant for a specific user, creating a personal connection between the digital assistant and the user. The digital assistant accesses user activity and generates queries based on the user activity. The digital assistant facilitates natural language conversations as machine learning sessions between the digital assistant and the user using the one or more queries to learn the user's preferences and receives user input from the user during the learning session in response to the queries. The digital assistant dynamically updates a personalized profile for the user based on the user input during the natural language conversations.

20 Claims, 7 Drawing Sheets

(56) References Cited

U.S. PATENT DOCUMENTS

| | | | | |
|---|---|---|---|---|
| 7,922,494 B2* | 4/2011 | Banerjee | G09B 7/02 | 434/323 |
| 7,966,369 B1* | 6/2011 | Briere | G06Q 10/10 | 707/616 |
| 8,032,480 B2* | 10/2011 | Pinckney | G06N 20/00 | 706/62 |
| 8,296,383 B2 | 10/2012 | Lindahl | | |
| 8,331,739 B1* | 12/2012 | Abdulkader | G06K 9/033 | 358/1.11 |
| 8,346,563 B1* | 1/2013 | Hjelm | G10L 15/1822 | 379/88.01 |
| 8,543,407 B1 | 9/2013 | Gagnon et al. | | |
| 8,639,716 B2 | 1/2014 | Volkert | | |
| 8,706,503 B2 | 4/2014 | Cheyer et al. | | |
| 8,725,849 B1 | 5/2014 | Lloyd | | |
| 8,731,942 B2 | 5/2014 | Cheyer et al. | | |
| 8,781,813 B2* | 7/2014 | Cooper | G06F 17/275 | 704/9 |
| 8,903,716 B2* | 12/2014 | Chen | G06F 17/3087 | 704/10 |
| 9,043,405 B2* | 5/2015 | Ly | G06F 17/30864 | 709/206 |
| 9,070,247 B2 | 6/2015 | Kuhn | G07F 17/3211 | |
| 9,152,775 B1* | 10/2015 | Kronrod | G06F 21/31 | |
| 9,223,537 B2* | 12/2015 | Brown | G06F 3/165 | |
| 9,245,231 B2* | 1/2016 | Pinckney | G06Q 30/02 | |
| 9,276,802 B2* | 3/2016 | Lynch | H04L 29/08081 | |
| 9,449,091 B1* | 9/2016 | Rao | G06F 17/30861 | |
| 9,514,407 B1* | 12/2016 | Dotan | G06N 5/022 | |
| 9,536,049 B2* | 1/2017 | Brown | G06F 19/345 | |
| 9,576,574 B2* | 2/2017 | van Os | G10L 15/22 | |
| 9,626,703 B2* | 4/2017 | Kennewick, Sr. | G06Q 30/0601 | |
| 9,703,617 B2* | 7/2017 | Allen | G06F 9/543 | |
| 9,715,875 B2* | 7/2017 | Piernot | G10L 15/22 | |
| 9,747,384 B1* | 8/2017 | Rao | G06F 17/30893 | |
| 9,769,286 B2* | 9/2017 | Yamagishi | H04L 67/42 | |
| 9,769,526 B2* | 9/2017 | Yamagishi | H04N 21/458 | |
| 9,886,953 B2* | 2/2018 | Lemay | G10L 15/22 | |
| 9,953,088 B2* | 4/2018 | Gruber | G06F 16/9535 | |
| 2001/0037206 A1* | 11/2001 | Falk | G06Q 30/02 | 705/1.1 |
| 2001/0047270 A1* | 11/2001 | Gusick | G06Q 30/016 | 705/1.1 |
| 2002/0023144 A1* | 2/2002 | Linyard | G06F 9/4446 | 709/218 |
| 2002/0029203 A1* | 3/2002 | Pelland | G06F 3/011 | 706/12 |
| 2002/0031756 A1* | 3/2002 | Holtz | G09B 7/02 | 434/362 |
| 2003/0028498 A1* | 2/2003 | Hayes-Roth | G06N 20/00 | 706/17 |
| 2003/0046689 A1* | 3/2003 | Gaos | G06Q 30/02 | 725/34 |
| 2003/0190593 A1* | 10/2003 | Wisnosky | G09B 7/00 | 434/362 |
| 2004/0044516 A1* | 3/2004 | Kennewick | G10L 15/22 | 704/5 |
| 2004/0059705 A1* | 3/2004 | Wittke | G06N 5/00 | |
| 2005/0143138 A1* | 6/2005 | Lee | G06F 3/011 | 455/566 |
| 2007/0058569 A1* | 3/2007 | McMenamin | H04L 29/06027 | 370/254 |
| 2007/0136264 A1* | 6/2007 | Tran | G06F 17/30867 | |
| 2007/0226215 A1* | 9/2007 | Tamaki | G06Q 30/06 | |
| 2008/0062895 A1* | 3/2008 | Chapman | G06Q 10/10 | 370/270 |
| 2008/0096533 A1* | 4/2008 | Manfredi | G06N 3/006 | 455/412.1 |
| 2008/0133716 A1* | 6/2008 | Rao | G06Q 30/08 | 709/220 |
| 2008/0140786 A1* | 6/2008 | Tran | G06Q 10/10 | 709/206 |
| 2009/0089044 A1* | 4/2009 | Cooper | G06F 17/275 | 704/9 |
| 2009/0182702 A1* | 7/2009 | Miller | G06F 17/30654 | 706/60 |
| 2009/0183179 A1* | 7/2009 | Keith | G06Q 30/02 | 719/318 |
| 2009/0197236 A1 | 8/2009 | Phillips | | |
| 2009/0280456 A1* | 11/2009 | Ishaq | G09B 7/00 | 434/118 |
| 2009/0281997 A1* | 11/2009 | Jain | G06F 17/30864 | |
| 2009/0307159 A1* | 12/2009 | Pinckney | G06N 20/00 | 706/11 |
| 2009/0313299 A1* | 12/2009 | Bonev | G06Q 10/109 | |
| 2010/0023320 A1* | 1/2010 | Di Cristo | G06F 17/273 | 704/9 |
| 2010/0057443 A1* | 3/2010 | Di Cristo | G06F 17/279 | 704/9 |
| 2011/0082764 A1* | 4/2011 | Flusser | G06Q 30/00 | 705/26.7 |
| 2011/0093337 A1* | 4/2011 | Granit | G06Q 30/0251 | 705/14.53 |
| 2011/0153362 A1* | 6/2011 | Valin | G06Q 20/105 | 705/3 |
| 2012/0005030 A1* | 1/2012 | Valin | G06Q 20/10 | 705/14.73 |
| 2012/0016678 A1* | 1/2012 | Gruber | G06F 17/3087 | 704/275 |
| 2012/0022872 A1* | 1/2012 | Gruber | G06F 17/279 | 704/270.1 |
| 2012/0041937 A1* | 2/2012 | Dhillon | G06F 17/30731 | 707/708 |
| 2012/0054267 A1* | 3/2012 | Yamagishi | H04N 21/8543 | 709/203 |
| 2012/0054783 A1* | 3/2012 | Yamagishi | H04N 21/4758 | 725/13 |
| 2012/0122588 A1* | 5/2012 | Berger | A63F 13/80 | 463/42 |
| 2012/0143863 A1* | 6/2012 | Tran | G06F 17/30867 | 707/732 |
| 2012/0173464 A1 | 7/2012 | Tur et al. | | |
| 2012/0196262 A1* | 8/2012 | Stillman | G06Q 30/02 | 434/322 |
| 2012/0231441 A1* | 9/2012 | Parthasarathy | G09B 7/02 | 434/362 |
| 2012/0265528 A1* | 10/2012 | Gruber | G10L 15/18 | 704/235 |
| 2012/0271676 A1 | 10/2012 | Aravamudan et al. | | |
| 2012/0296638 A1* | 11/2012 | Patwa | G06F 17/30654 | 704/9 |
| 2013/0018824 A1* | 1/2013 | Ghani | G06N 99/005 | 706/12 |
| 2013/0086169 A1* | 4/2013 | Bruich | H04L 65/40 | 709/204 |
| 2013/0117022 A1* | 5/2013 | Chen | G06F 17/3087 | 704/235 |
| 2013/0151527 A1* | 6/2013 | Bruich | G06F 17/30598 | 707/737 |
| 2013/0204813 A1* | 8/2013 | Master | G06N 20/00 | 706/12 |
| 2013/0224718 A1* | 8/2013 | Woodward | G09B 7/00 | 434/350 |
| 2013/0254139 A1 | 9/2013 | Lei | | |
| 2013/0267319 A1* | 10/2013 | Kuhn | G07F 17/3211 | 463/34 |
| 2013/0275138 A1* | 10/2013 | Gruber | G10L 13/00 | 704/260 |
| 2013/0275164 A1* | 10/2013 | Gruber | G10L 17/22 | 705/5 |
| 2013/0275875 A1* | 10/2013 | Gruber | G10L 15/22 | 715/728 |
| 2013/0283168 A1* | 10/2013 | Brown | G06F 3/165 | 715/728 |
| 2013/0304758 A1* | 11/2013 | Gruber | G06F 17/30976 | 707/769 |
| 2013/0311924 A1* | 11/2013 | Denker | G06F 3/013 | 715/771 |

(56) References Cited

U.S. PATENT DOCUMENTS

| | | | |
|---|---|---|---|
| 2013/0339445 A1* | 12/2013 | Perincherry | H04L 67/306 709/204 |
| 2014/0007224 A1 | 1/2014 | Lu et al. | |
| 2014/0019542 A1* | 1/2014 | Rao | H04L 67/306 709/204 |
| 2014/0037076 A1* | 2/2014 | Bouzid | H04M 3/42204 379/88.03 |
| 2014/0074483 A1* | 3/2014 | van Os | G10L 15/22 704/275 |
| 2014/0101058 A1* | 4/2014 | Castel | G06Q 10/20 705/305 |
| 2014/0101247 A1* | 4/2014 | Pappas | H04L 67/22 709/204 |
| 2014/0115466 A1* | 4/2014 | Barak | G06F 3/0484 715/716 |
| 2014/0136013 A1 | 5/2014 | Wolverton et al. | |
| 2014/0143666 A1 | 5/2014 | Kennedy et al. | |
| 2014/0149278 A1* | 5/2014 | Windsor | G06Q 40/025 705/38 |
| 2014/0164400 A1 | 6/2014 | Kruglick | |
| 2014/0164476 A1 | 6/2014 | Thomson | |
| 2014/0164508 A1* | 6/2014 | Lynch | H04L 29/08081 709/204 |
| 2014/0172415 A1* | 6/2014 | Jo | G06F 17/2785 704/9 |
| 2014/0181741 A1* | 6/2014 | Apacible | G06Q 10/109 715/810 |
| 2014/0195252 A1* | 7/2014 | Gruber | G10L 15/22 704/275 |
| 2014/0201629 A1 | 7/2014 | Heck | |
| 2014/0214615 A1* | 7/2014 | Greystoke | G06Q 30/0631 705/26.44 |
| 2014/0218372 A1* | 8/2014 | Missig | G06F 3/044 345/473 |
| 2014/0222436 A1 | 8/2014 | Binder et al. | |
| 2014/0272909 A1* | 9/2014 | Isensee | G09B 7/02 434/362 |
| 2014/0278413 A1* | 9/2014 | Pitschel | G10L 15/063 704/243 |
| 2014/0278444 A1* | 9/2014 | Larson | H04M 1/72522 704/275 |
| 2014/0278739 A1* | 9/2014 | Sane | G06Q 30/0201 705/7.29 |
| 2014/0280087 A1* | 9/2014 | Isensee | G06F 17/30477 707/723 |
| 2014/0297754 A1* | 10/2014 | Ross | G06Q 10/10 709/204 |
| 2014/0317502 A1* | 10/2014 | Brown | G06F 9/4446 715/706 |
| 2014/0337048 A1* | 11/2014 | Brown | G06F 19/345 705/2 |
| 2014/0343924 A1* | 11/2014 | Brown | G06F 17/30654 704/9 |
| 2014/0365209 A1* | 12/2014 | Evermann | G06F 17/279 704/9 |
| 2014/0365216 A1* | 12/2014 | Gruber | G10L 13/027 704/235 |
| 2014/0365223 A1* | 12/2014 | Brown | G06F 17/30654 704/270.1 |
| 2014/0365226 A1* | 12/2014 | Sinha | G10L 25/00 704/275 |
| 2014/0365227 A1* | 12/2014 | Cash | G10L 15/22 704/275 |
| 2014/0365407 A1* | 12/2014 | Brown | G06F 17/30654 706/11 |
| 2014/0365885 A1* | 12/2014 | Carson | G06F 3/167 715/708 |
| 2015/0012467 A1* | 1/2015 | Greystoke | G06N 99/005 706/12 |
| 2015/0026163 A1* | 1/2015 | Haggar | G06F 17/30654 707/723 |
| 2015/0039536 A1* | 2/2015 | Cook | G06N 5/02 706/11 |
| 2015/0045003 A1* | 2/2015 | Vora | H04M 1/64 455/412.2 |
| 2015/0121216 A1* | 4/2015 | Brown | G06N 3/006 715/707 |
| 2015/0127586 A1* | 5/2015 | Pinckney | G06Q 30/02 706/11 |
| 2015/0162000 A1* | 6/2015 | Di Censo | G10L 15/22 704/270.1 |
| 2015/0169284 A1* | 6/2015 | Quast | G06F 3/167 704/275 |
| 2015/0169336 A1* | 6/2015 | Harper | G10L 15/22 715/706 |
| 2015/0172262 A1* | 6/2015 | Ortiz, Jr. | H04W 12/04 726/4 |
| 2015/0172463 A1* | 6/2015 | Quast | H04M 3/4936 379/88.01 |
| 2015/0186110 A1* | 7/2015 | Kannan | G06F 3/167 715/728 |
| 2015/0186154 A1* | 7/2015 | Brown | G06F 3/04817 715/706 |
| 2015/0186155 A1* | 7/2015 | Brown | G06F 3/04817 715/706 |
| 2015/0186156 A1* | 7/2015 | Brown | G06F 3/04817 715/706 |
| 2015/0213355 A1* | 7/2015 | Sharma | G06N 3/006 706/11 |
| 2015/0213800 A1* | 7/2015 | Krishnan | H04M 3/4936 704/246 |
| 2015/0254785 A1* | 9/2015 | Yang | G06N 7/005 705/26.41 |
| 2015/0269210 A1* | 9/2015 | Feng | G06Q 10/00 705/26.1 |
| 2015/0281401 A1* | 10/2015 | Le | H04L 67/42 709/203 |
| 2015/0331601 A1* | 11/2015 | Rosenberg | G06F 3/04842 715/753 |
| 2015/0347900 A1* | 12/2015 | Bell | G06N 5/02 706/11 |
| 2015/0348548 A1* | 12/2015 | Piernot | G10L 15/22 704/235 |
| 2015/0348549 A1* | 12/2015 | Giuli | G06F 17/2785 704/235 |
| 2015/0348551 A1* | 12/2015 | Gruber | G06F 17/2705 704/235 |
| 2015/0363486 A1* | 12/2015 | Shimizu | G06F 17/30654 707/736 |
| 2015/0373183 A1* | 12/2015 | Woolsey | G06F 17/289 348/14.08 |
| 2015/0382047 A1* | 12/2015 | Van Os | G10L 15/22 725/38 |
| 2016/0019805 A1* | 1/2016 | Allen | G09B 7/02 434/322 |
| 2016/0063998 A1* | 3/2016 | Krishnamoorthy | G10L 15/02 704/254 |
| 2016/0077794 A1* | 3/2016 | Kim | G06F 3/167 704/275 |
| 2016/0092792 A1* | 3/2016 | Chandrasekaran | G06F 17/3053 706/12 |
| 2016/0093291 A1* | 3/2016 | Kim | G10L 15/01 381/56 |
| 2016/0110071 A1* | 4/2016 | Brown | G06F 3/165 715/758 |
| 2016/0132198 A1* | 5/2016 | Sinclair | G06F 3/0482 715/739 |
| 2016/0155445 A1* | 6/2016 | Selfridge | G10L 15/1822 704/249 |
| 2016/0170997 A1* | 6/2016 | Chandrasekaran | G06N 5/04 707/732 |
| 2016/0173578 A1* | 6/2016 | Sharma | H04L 67/1002 709/203 |
| 2016/0179464 A1* | 6/2016 | Reddy | G06F 3/167 715/728 |

(56) References Cited

U.S. PATENT DOCUMENTS

| | | | | |
|---|---|---|---|---|
| 2016/0180726 A1* | 6/2016 | Ahuja | ............... | G09B 7/00 434/322 |
| 2016/0196334 A1* | 7/2016 | Bastide | ............... | G06F 17/30539 707/776 |
| 2016/0196490 A1* | 7/2016 | Chandrasekaran | ............... | G06F 17/30554 706/50 |
| 2016/0196491 A1* | 7/2016 | Chandrasekaran | ............... | G06F 17/30554 706/50 |
| 2016/0220903 A1* | 8/2016 | Miller | ............... | A63F 13/537 |
| 2016/0260433 A1* | 9/2016 | Sumner | ............... | G06F 17/30976 |
| 2016/0260436 A1* | 9/2016 | Lemay | ............... | G10L 15/28 |
| 2016/0294836 A1* | 10/2016 | Williams | ............... | H04L 63/102 |
| 2016/0300154 A1* | 10/2016 | Bufe | ............... | G06N 7/005 |
| 2016/0306684 A1* | 10/2016 | Allen | ............... | G06F 9/543 |
| 2016/0306685 A1* | 10/2016 | Allen | ............... | G06F 9/543 |
| 2016/0342317 A1* | 11/2016 | Lim | ............... | G10L 15/1822 |
| 2017/0017501 A1* | 1/2017 | Quast | ............... | G10L 15/22 |
| 2017/0161268 A1* | 6/2017 | Badaskar | ............... | G06F 17/3005 |
| 2017/0186429 A1* | 6/2017 | Giuli | ............... | G10L 15/22 |
| 2017/0220693 A1* | 8/2017 | Bruich | ............... | G06F 17/30339 |
| 2017/0262529 A1* | 9/2017 | Chim | ............... | G06F 17/30684 |
| 2018/0114234 A1* | 4/2018 | Fighel | ............... | G06Q 30/0201 |
| 2018/0130470 A1* | 5/2018 | Lemay | ............... | G10L 15/28 |

OTHER PUBLICATIONS

Knight, Will, "Where Speech Recognition Is Going", Published on: May 29, 2012 Available at: http://www.technologyreview.com/news/427793/where-speech-recognition-is-going/.

Belfiore, Joe, "Cortana (yes!) and Many, Many Other Great Features coming in Windows Phone 8.1", Published on: Apr. 2, 2014, Available at: http://blogs.windows.com/bloggingwindows/2014/04/02/cortana-yes-and-many-many-other-great-features-coming-in-windows-phone-8-1/.

Hill, Simon, "Our Sid Guide: How to Merge Your Life with Apple's Witty Virtual Assistant", Published on: Nov. 23, 2013, Available at: http://www.digitaltrends.com/mobile/how-to-use-siri/.

* cited by examiner

CRAFTING FEEDBACK DIALOGUE WITH A DIGITAL ASSISTANT

CROSS-REFERENCE TO RELATED APPLICATIONS

The present application is related to co-pending U.S. patent applications entitled "Facet Recommendations From Sentiment-Bearing Content" (application Ser. No. 14/475,450), and "Crafting a Response Based on Sentiment Identification"(application Ser. No. 14/719,173), each assigned to the assignee of the present application.

BACKGROUND

Collecting user feedback associated with digital assistants is generally conducted with usability studies, forums, social media, or using online surveys. Some existing systems provide user configurable settings for tailoring the performance of a digital assistant. These systems rely on a user identifying a desired improvement area and manually adjust settings in order to achieve the desired performance. Such systems are inefficient, non-intuitive, and may lead to frustration for the user.

SUMMARY

Examples of the disclosure are generally directed towards a system and method for accessing activity logs corresponding to a user associated with a computing device and generating one or more queries based on the activity logs. A digital assistant initiates a natural language conversation as a machine learning session between the digital assistant and the user using the one or more generated queries. The digital assistant receives user input during the natural language conversation in response to the one or more queries and updates a personalized profile associated with the user based on the user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
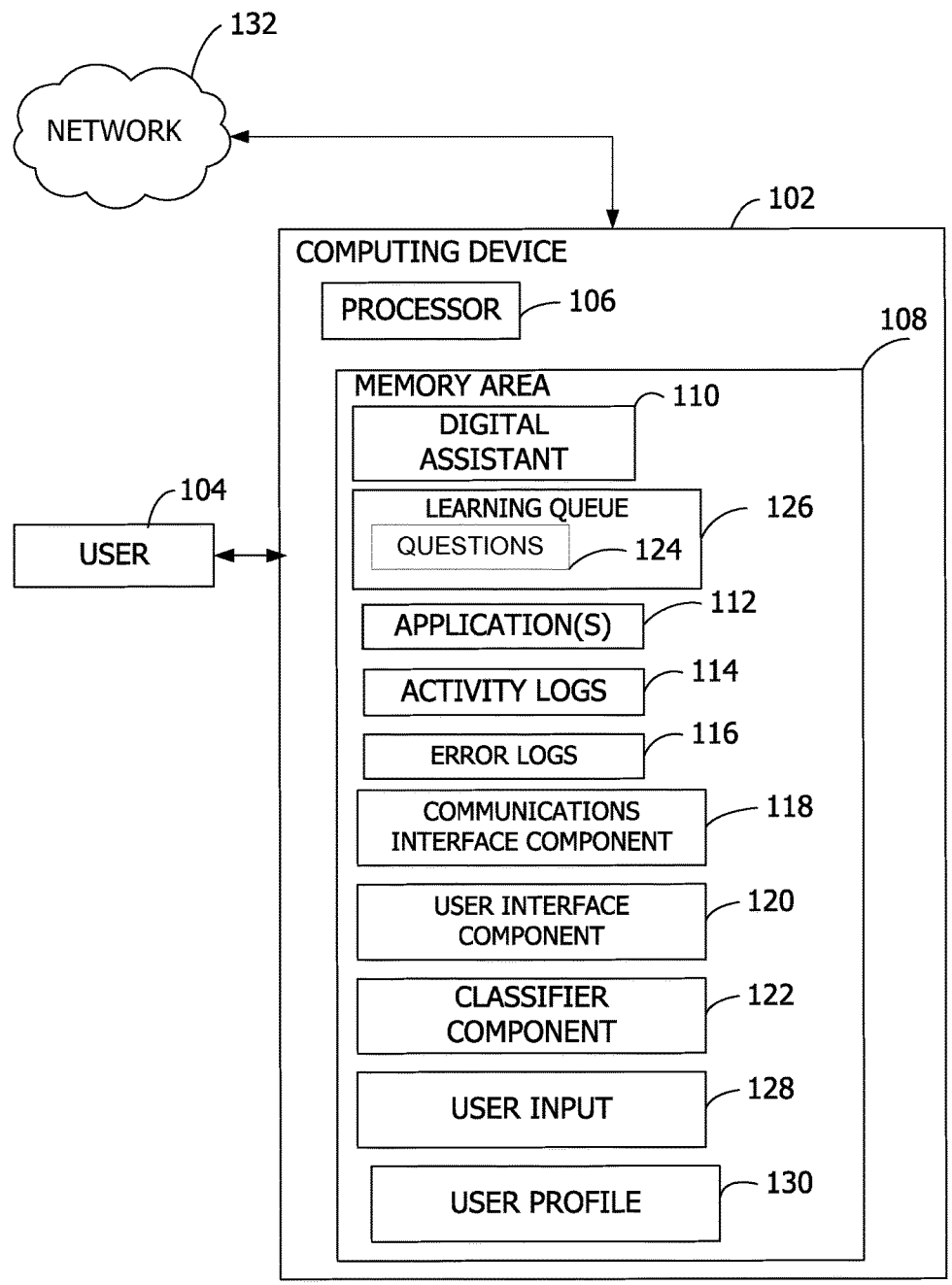
FIG. 1 is an exemplary block diagram illustrating a computing device for developing a personalized digital assistant.

Referring to the figures, examples of the disclosure enable an intelligent digital assistant to form a personal connection, or bond, with its user. In some examples, the intelligent digital assistant analyzes the user's activities to develop inferences and engages in one-on-one natural language conversations to confirm those inferences with the user. In these examples, confirming the inferences through natural language conversations with the user allows the digital assistant to dynamically personalize a user profile, improving user interactions and tailoring digital assistance to user preferences that are dynamically learned and updated as the inferences are refined over time.

Aspects of the disclosure further enable an intelligent digital assistant to mine or analyze logged user activity based on signals generated from computing device resources, such as a camera or GPS for example, and identify digital assistant-desired areas of user feedback. In some examples, the digital assistant identifies user activity that the digital assistant wants to learn more about with regard to user preferences associated with the identified activity, in order to personalize the assistance provided for the specific user of the digital assistant. Aspects of the disclosure operate to provide device resources to the personal assistant to identify information about user activity, identify areas where the digital assistant may improve personalization, and determine if a learning opportunity associated with a user interest or preference is present based upon the identified activity and areas. The digital assistant generates questions based on the identified learning area and presents those questions as a natural language conversation to elicit feedback, using the feedback confirm inferences and further personalize the digital assistant's user interactions.

The intelligent digital assistant uses reflection based on logged activity to infer what the user wants in the future, and pulls targeted feedback from the user through natural language conversations to refine its inferences. By prompting the user for feedback using specific questions in a natural language conversation and identifying targeted sentiment in user input responses, the digital assistant not only refines its personalized knowledge base of specific user preferences to form a personal connection with its specific user, it also improves user efficiency via user interface interaction and increases user interaction performance. Targeted sentiment refers to sentiment directed at a facet or facet item. Targeted sentiment may be positive, negative, or neutral (also identified as lack of sentiment). A facet may be a categorized entity or item in these examples. Additionally, as the personal connection grows through continued natural language conversations, or learning sessions, the digital assistant reduces error rates for assistance-based tasks and increases accuracy of assistant inferences and recommendations for the user.

Referring again to FIG. 1, an exemplary block diagram illustrates a computing device for developing a personalized digital assistant. In the example of FIG. 1, the computing device associated with a user represents a system for mining activity logs to identify areas where personalization or learning is desired for the digital assistant. The computing device represents any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 3-5).

In some examples, the processor represents an implementation of analog techniques to perform the operations described herein. For example, the operations may be performed by an analog computing device and/or a digital computing device.

Figure 2:
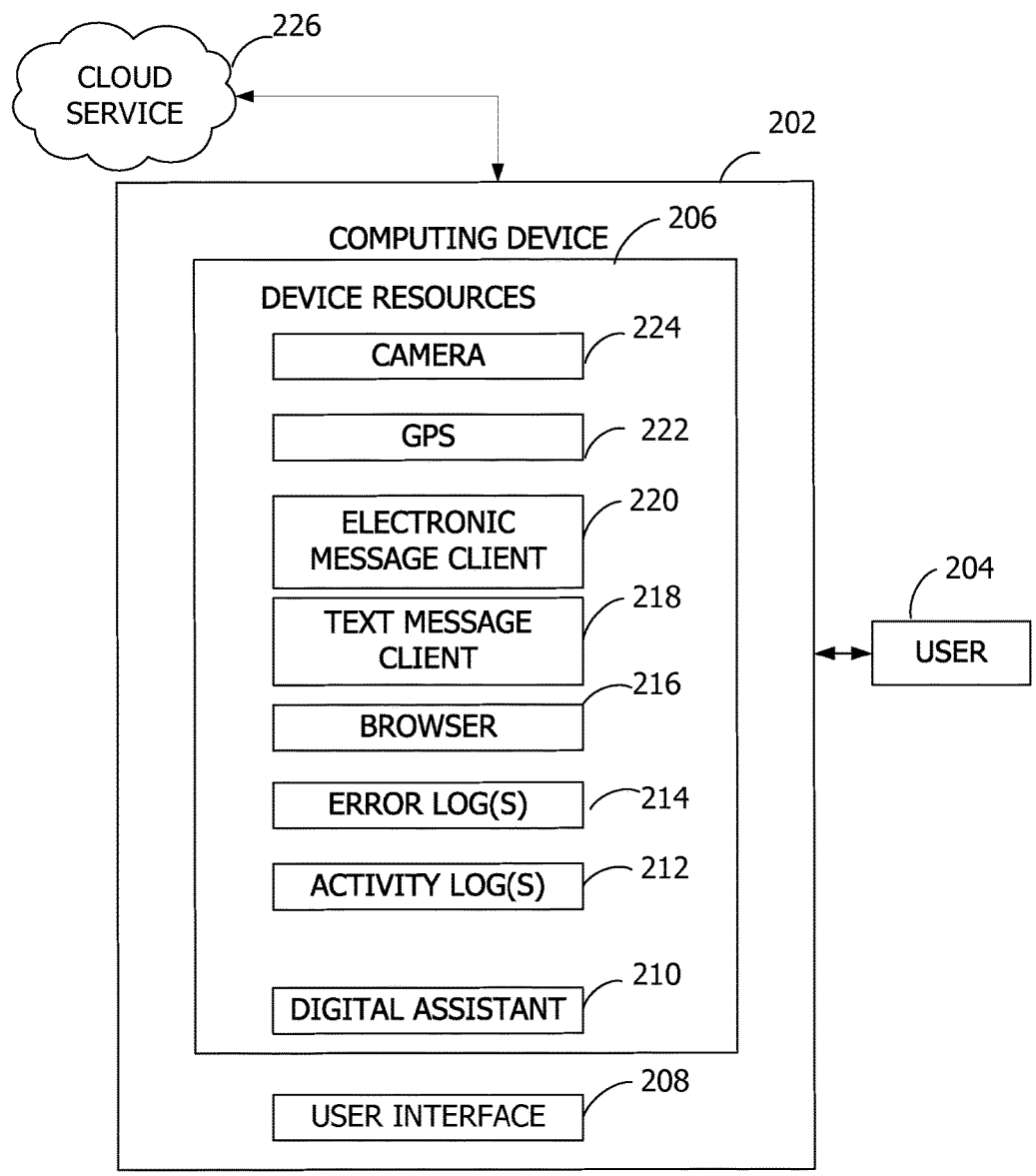
FIG. 2 is an exemplary block diagram illustrating a computing device implementing the personalized digital assistant.

The computing device further has one or more computer readable media such as the memory area. The memory area includes any quantity of media associated with or accessible by the computing device. The memory area may be internal to the computing device (as shown in FIG. 1-2), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area further stores activity logs associated with user activity and/or computing device activity associated with a user. The memory area may further store error logs associated with the computing device and/or user activity corresponding to the computing device. For example, error logs may generate signals corresponding to user-initiated task failures, and these signals may be stored for processing by a digital assistant to identity areas of desired feedback.

The memory area further stores one or more computer-executable components. Exemplary components include a communications interface component, a user interface component, and a classifier component. The user interface component, when executed by the processor of the computing device, causes the processor to output data to the user interface component and process user input received via the user interface component.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Referring again to FIG. 1, an exemplary block diagram illustrates a computing device for developing a personalized digital assistant. Computing device 102 may be associated with user 104. Computing device 102 may include processor 106 communicatively coupled to memory area 108. Memory area 108 includes digital assistant 110, which may be one implementation of a personal digital assistant executed by processor 106 to provide personalized assistance to user 104.

Memory area 108 may also include applications 112, activity logs 114, error logs 116, communications component 118, user interface component 120, and classifier component 122. In some examples, processor 106 may execute digital assistant 110 to process activity logs 114 maintained in memory area 108. Processing activity logs 114 may include analyzing data within activity logs 114 to identify areas of interest for digital assistant learning. In some examples, analyzing data associated with activity logs 114 results in digital assistant 110 developing inferences about a user or user activity corresponding to activity logs 114. In order to further develop the personal connection with its user, digital assistant 110 may craft questions designed to confirm these generated inferences resulting from activity log mining.

Digital assistant 110 may generate one or more questions 124 corresponding to activity logs 114. The generated questions or queries, crafted to confirm inferences developed by digital assistant 110 during analysis of activity logs 114, may be maintained in learning queue 126. Digital assistant 110 may periodically analyze learning queue 126 to determine whether a number of stored queries or questions in learning queue 126 has reached a threshold. The threshold may be a predetermined storage threshold, or may be a threshold relating to one area of interest, such as a threshold number of questions relating to a topical area of desired learning for digital assistant 110, or any other suitable threshold. Responsive to determining that the threshold has been reached, digital assistant 110 may initiate a natural language conversation as a machine learning session with user 104 based on the generated questions 124 or other stored questions or queries maintained in learning queue 126. During the natural language conversation with user 104, digital assistant 110 may receive user input 128 in response to the generated questions 124.

As one example, during analysis of activity logs 114, digital assistant 110 may develop an inference that user 104 has an interest in sports, perhaps based on browser history or other user activity indicating that user 104 tracks a sport, such as football for example. Digital assistant 110 may generate a question to confirm this inference, such as "How am I doing on tracking sports?" In one example, user 104 could respond with a question to digital assistant 110, such as "can you track college football for me?" or "when does college football begin?" This response may be used not only to confirm the inference developed by digital assistant 110, in this example that user 104 has an interest in sports, but may also be used to update user profile 130 associated with user 104 to indicate that user 104 has an interest in college football in particular. Digital assistant 110 may also close the feedback loop by responding appropriately to user 104, in this example perhaps by replying "By the way, I added college football tracking like you asked for!" By confirming inferences developed during activity log mining, through natural language conversations, digital assistant 110 is able to dynamically personalize a user profile and refine future inferences for increased accuracy and efficiency in user interactions, with minimal to no effort on the part of the user. In this way, the digital assistant can strengthen the bond with a user to provide a more personalized experience without requiring the user to input preferences and update interests.

The digital assistant 110 may also use classifier component 122 to identify sentiment associated with, or targeted at, one or more facets of the user input. A facet may be a categorized entity or item in these examples. For example, the user input may include a phrase, such as "the sandwich was too greasy." The facet of the exemplary portion of user input is "sandwich" and the targeted sentiment identified by classifier component may be negative sentiment directed towards the sandwich. The digital assistant performs sentiment analysis on the user input during the natural language conversation, identifies the sentiment directed towards a facet of at least one of the queries or questions generated, and may also generate a response to the user input during the natural language conversation using the identified sentiment, or targeted sentiment. Digital assistant 110 may use the identified targeted sentiment in combination with the content of user input 128, such as lexical features, syntactic features, and any other suitable linguistic features, to update user profile 130. In this way, digital assistant 110 is strengthening a personal connection with user 104 by identifying questions that dig deeper into a user's activity, refine inferences made by digital assistant 110, and personalize user profile 130 specific to the activity, sentiment, and preferences learned by digital assistant 110 through natural language conversations.

Network 132 may enable computing device 102 to connect with and/or communicate with one or more services or other resources. Additionally, although the components of computing device 102 are depicted as implemented within computing device 102, one or more of these components may be implemented remote from computing device 102 and accessible via network 130.

FIG. 2 is an exemplary block diagram illustrating a computing device implementing the personalized digital assistant. Computing device 202 may be any device executing instructions (e.g., as application programs, operating system functionality, or both) to implement the operations and functionality associated with the computing device. In these examples, computing device 202 may include, without limitation, a mobile computing device or any other portable device, a less portable device, or a group of processing units or other computing devices. In some examples, a mobile computing device may include a mobile telephone, laptop, tablet, computing pad, netbook, gaming device, wearable computing device, and/or portable media player. A less portable devices may include desktop personal computers, kiosks, tabletop devices, industrial control devices, wireless charging stations, and electric automobile charging stations, in these examples.

Computing device 202 may be associated with user 204. Computing device 202 may include device resources 206 and user interface 208. User 204 may interact with device resources 206 of computing device 202 via user interface 208. Device resources 206 may include digital assistant 210, activity log(s) 212, error log(s) 214, browser 216, text message client 218, electronic message client 220, global positioning system (GPS) 222, and camera 224.

Activity logs 212 maintains user activity history associated with user 204. User activity history may include, for example, without limitation, device location information associated with signals received from GPS 222 and a time stamp indicating an amount of time computing device 202 remained at a specific geographic location, and/or a date and time computing device 202 was located at the specific geographic location. Other user activity history may include, for example, browser history associated with browser 216, captured images on a camera roll or photo storage associated with camera 224, textual input associated with electronic message client 220 and/or text message client 218, or any other logged user activity associated with computing device 202. In some examples, camera 224 may generate signals corresponding to captured images, and the generated signals may be stored in the activity logs. Digital assistant 210 may process the stored signals generated by the camera to identify areas of desired feedback. For example, a stored signal may indicate an image was captured, and the digital assistant may process the captured image and identify an entity within the image that prompts further learning opportunities.

In one example, digital assistant 210 may access activity logs 212 to identify areas of interest for personalized learning or desired feedback. For example, digital assistant 210 may identify that computing device 202 was located at a specific location for a duration of two hours based on logged GPS signals and a timestamp associated with the GPS signals. In this example, digital assistant 210 may utilize a search engine, such as a search engine associated with browser 216, to identify an entity corresponding to the specific location, which may be a restaurant. Digital assistant 210 may infer that user 204 ate at the identified restaurant based on the duration of time computing device 202 associated with user 204 was located at the identified restaurant. In order to confirm this inference, digital assistant 210 may identify this inference as an area where feedback is desired. Digital assistant 210 may generate one or more questions corresponding to the area where feedback is desired, in this example the inference made by the digital assistant that user ate at the identified restaurant.

Digital assistant 210 may initiate a natural language conversation based on the generated questions to obtain feedback from user 204 in order to personalize the interaction with digital assistant 210 and strengthen a personal connection between digital assistant 210 and user 204. As an example, digital assistant 210 may generate questions that incorporate the inference, such as the digital assistant asking: "I see you ate at Restaurant A last week; how did you like the food?" By incorporating the inference into the questions, digital assistant 210 seeks confirmation of the inference, as well as feedback related to the user's preference with regard to a specific restaurant, during the natural language conversation with user 204.

Digital assistant 210 may also dynamically adapt responses to received user input during the natural language conversation to address identified sentiment, confirmed inferences, or denied inferences. For example, digital assistant 210 may use classifier component 122 to identify targeted sentiment in user input, and dynamically adapt responses in real-time by digital assistant 210 during the natural language conversation to respond to the identified targeted sentiment. As one example, if user input received to the question "I see you ate at Restaurant A last week; how did you like the food?" is "It was great!" digital assistant 210 may identify "food from Restaurant A" as a facet towards which a positive sentiment (e.g. great!) is directed. Digital assistant 210 may dynamically generate a response during the conversation that is adapted to the identified targeted sentiment, such as "I'm glad you liked it; would you like me to add Restaurant A to your favorites list?" as one example.

Additionally, digital assistant 210 may use classifier component 122 to identify targeted sentiment directed towards a facet in user input. The facet, an identified entity within the user input, such as Restaurant A in this example, is the facet towards which the sentiment is directed, or targeted. Digital assistant 210 may label the facet—Restaurant A—with a positive label, or categorize the facet in a positive category within a personalized knowledge base associated with the user profile for that user (e.g. restaurants the user likes, or food options associated with cuisine type of Restaurant A as a sub-category to restaurants within the personalized knowledge base). As another example, if the targeted sentiment identified is negative, such as user input stating "It was too greasy," digital assistant 210 may use a browser or other resource to find an antonym for the word "greasy," dynamically generate a response to the user during the conversation using the identified antonym, and label or categorize the facet, in this example the restaurant, negatively within a knowledge base (such as restaurants the user does not like, or unhealthy options as a sub-category to restaurants).

In this example, digital assistant 210 may also perform one or more tasks based on user input received during the natural language conversation with user 204, such as updating a personalized user profile with information corresponding to user 204 enjoying a type of cuisine or food, or specifically liking food from Restaurant A. Digital assistant 210 may also perform a task as a result of a confirmation in the user input directed towards a question about the task, such as adding a specific restaurant to a list of favorite restaurants associated with the user.

As another example, digital assistant 210 may access error logs 214 to identify task failures associated with user-initiated task attempts. For example, error logs 214 may include information corresponding to attempts by user 204 to create a task reminder within a device resource of computing device 202. Digital assistant 210 may infer from a number of logged task failures that this task is an area where the user may want more assistance or training. Digital assistant 210 may generate questions associated with this inference, such as "I see you are having trouble creating reminders; would you like me to provide a tutorial?" Digital assistant 210 seeks confirmation of the inference, as well as feedback related to the user's desire for a tutorial or additional help with this area of user interaction with computing device 202, during the natural language conversation with user 204.

Figure 3:
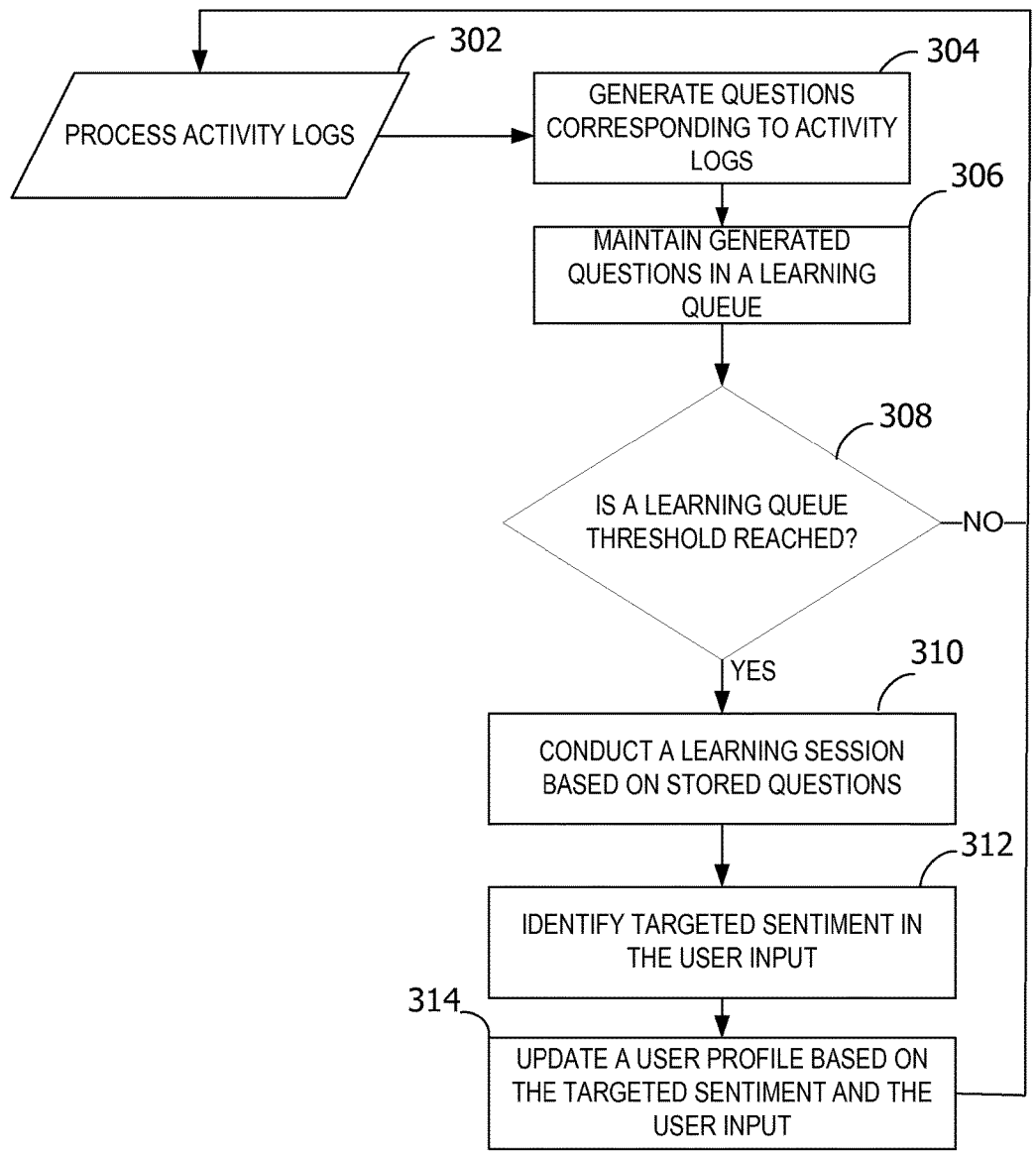
FIG. 3 is an exemplary flow chart illustrating operation of the computing device to develop a personal connection between the digital assistant and a user.

FIG. 3 is an exemplary flow chart illustrating operation of the computing device to develop a personal connection between the digital assistant and a user. These operations may be performed by a digital assistant executed by a processing unit of a computing device, such as digital assistant 110 executed by processor 106 of computing device 102.

The digital assistant processes activity logs (at 302) maintained in memory, such as memory area 108 in FIG. 1. The activity logs may include user activity history, device activity history, and/or any other logged activity associated with a user device.

The digital assistant generates questions corresponding to the activity logs (at 304). The questions may be based on inferences made by the digital assistant about information mined from the activity logs, for example. The generated questions are maintained in a learning queue (at 306). The learning queue may be a question repository, such as questions 124 in FIG. 1 for example.

The digital assistant determines whether a learning queue threshold has been reached (at 308). If the threshold has not been reached, the digital assistant continues to process activity logs, generate questions associated with inferences made and areas of interest for obtaining feedback, and maintains the generated questions in the learning queue.

If the threshold has been reached, the digital assistant conducts a learning session based on stored questions in the learning queue (at 310). The learning session may be conducted as a natural language conversation between the digital assistant and its user, for example. The threshold may be, for example, a predefined number of questions. As another example, the threshold may be, for example, a predefined number of areas of interest having at least one corresponding generated question.

Additionally, the threshold may be based on metrics other than a learning queue capacity or number of stored questions. For example, the threshold may be triggered based on detected user activity, time identified in a user's schedule as free time, an indication that the user is not busy or is less busy than usual, or any other indication that a learning session may be conducted with the user.

During the learning session, the digital assistant receives user input, such as natural language responses during a conversation. The digital assistant identifies targeted sentiment in the user input (at 312). The digital assistant may use a sentiment classifier, such as classifier component 122 in FIG. 1 for example, to identify the targeted sentiment in the user input.

The digital assistant updates a user profile based on the identified targeted sentiment and the user input (at 314), with the process iteratively processing activity logs to continue to personalize the connection with the digital assistant and the user.

Figure 4:
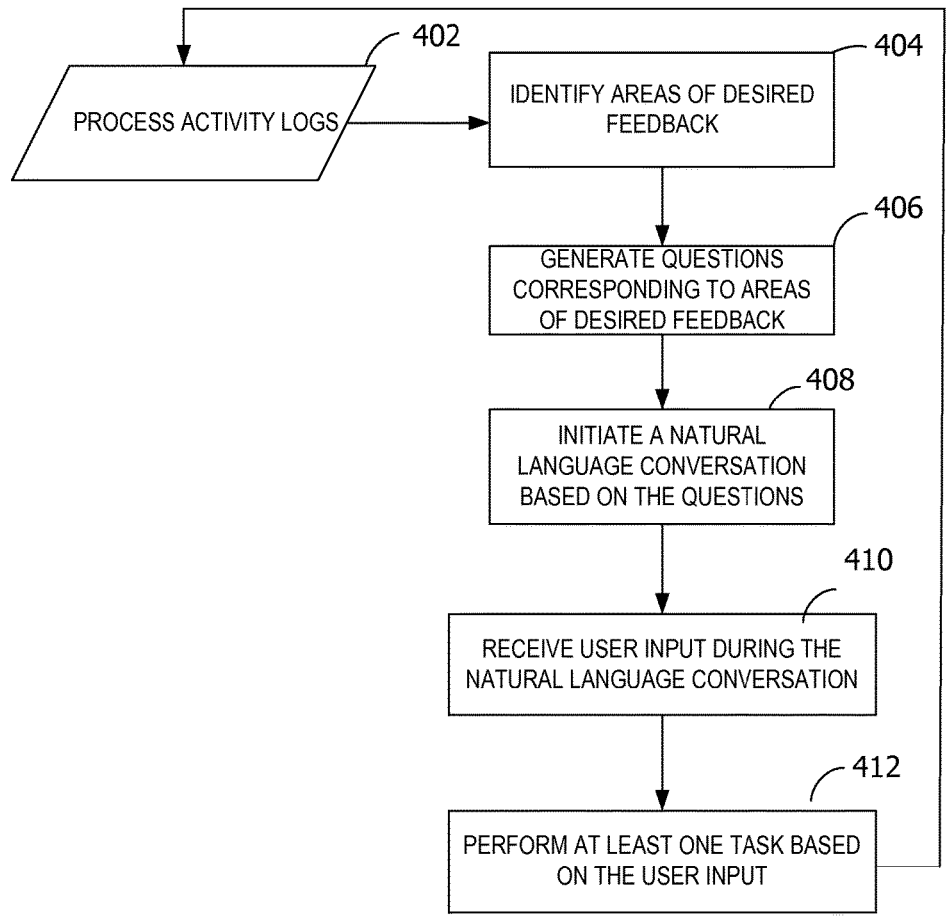
FIG. 4 is an exemplary flow chart illustrating operation of the computing device to develop the personalized digital assistant.

FIG. 4 is an exemplary flow chart illustrating operation of the computing device to develop the personalized digital assistant. These operations may be performed by a digital assistant executed by a processing unit of a computing device, such as digital assistant 110 executed by processor 106 of computing device 102.

The digital assistant processes activity logs (at 402) maintained in memory associated with a computing device. The digital assistant processes the activity logs to mine information from user history and device history, and identifies areas of desired feedback (at 404) related to improving personalization of the digital assistant.

The digital assistant generates questions corresponding to the areas of desired feedback (at 406) and initiates a natural language conversation with a user of the computing device based on the generated questions (at 408). The digital assistant receives user input during the natural language conversation with the user (at 410) and performs at least one task based on the user input (at 412). The tasks performed based on user input may correspond to updating a user profile, personalizing user preferences, scheduling a task, and/or any other suitable task corresponding to the user input. The digital assistant may iteratively process activity logs according to a schedule, signal input, and/or any other suitable trigger.

Figure 5:
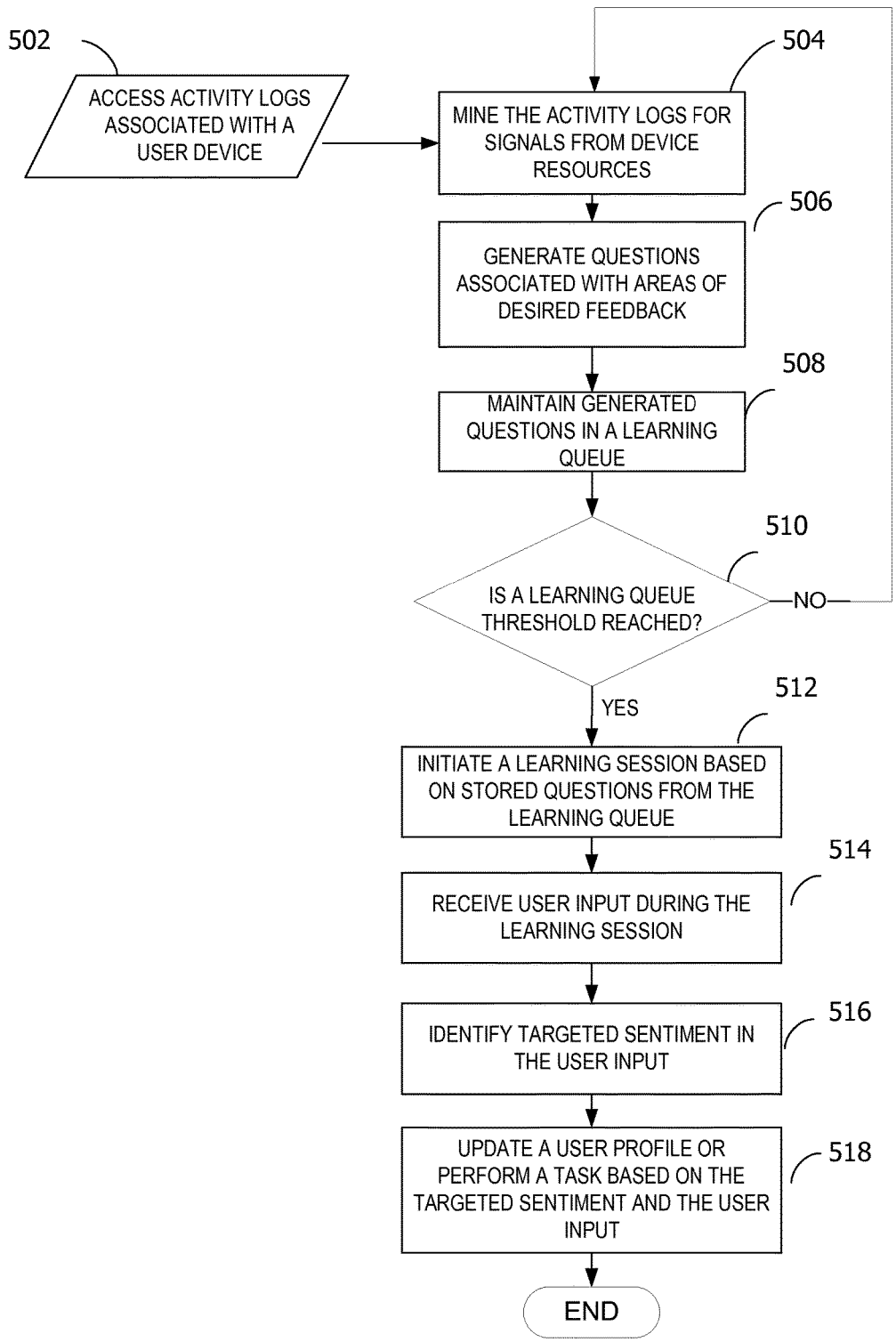
FIG. 5 is an exemplary flow chart illustrating operation of the computing device to identify areas of feedback interest and acquire targeted feedback for developing the personal connection.

FIG. 5 is an exemplary flow chart illustrating operation of the computing device to identify areas of feedback interest and acquire targeted feedback for developing the personal connection. These operations may be performed by a digital assistant executed by a mobile device, such as digital assistant 210 executed by computing device 202.

The digital assistant accesses activity logs associated with a user device (at 502), such as, without limitation, browser history logs, global positioning system history logs, messaging client logs, error logs, digital image storage rolls, and/or any other suitable activity log.

The digital assistant mines the activity logs for signals from device resources (at 504), such as, without limitation, a browser, GPS, camera, e-mail client, text client, and/or any other resource implemented on the mobile device. In these examples, the device resources, such as the exemplary resources listed above, may generate signals that are stored in activity logs accessible to the digital assistant, and the digital assistant may process selected signals from the activity logs to identify areas of desired feedback.

The digital assistant generates questions associated with areas of desired feedback (at 506). Areas of desired interest may be based on the signals mined from the activity logs. Areas of desired interest may also be based on inferences made based on the signals mined from the activity logs.

The digital assistant maintains the generated questions in a learning queue (at 508) and determines whether a learning queue threshold has been reached (at 510). If a determination is made that the threshold has not been reached, the digital assistant returns to mining the activity log and generating additional questions.

If the threshold has been reached, the digital assistant initiates a learning session based on the stored questions from the learning queue (at 512). The learning session may be conducted by the digital assistant as a natural language conversation between the digital assistant and a user, such that the digital assistant generates natural language questions and receives user input in the form of natural language responses, for example.

The digital assistant receives user input during the learning session (at 514) and identifies targeted sentiment in the user input (at 516). The digital assistant then updates a user profile or performs a task, or both, based on the targeted sentiment and the user input (at 518), with the process terminating thereafter. Alternatively, the process may iteratively process through the operations on a continual basis, according to a schedule, periodically, or according to any other suitable trigger.

Figure 6:
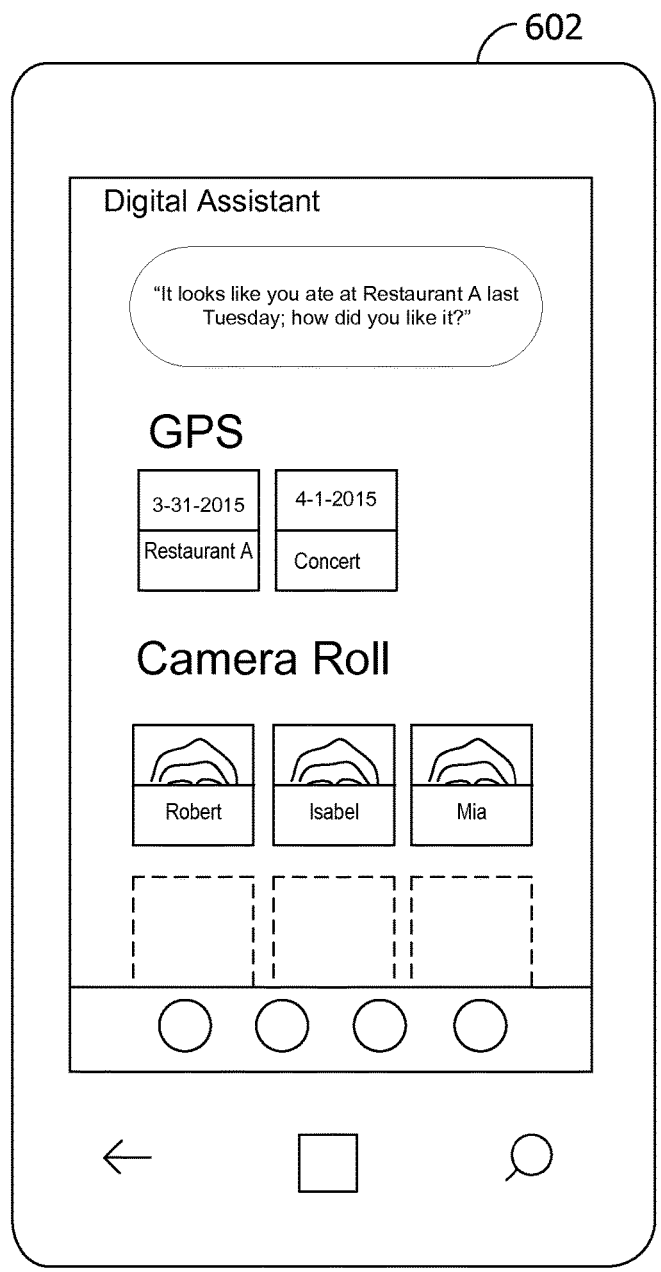
FIG. 6 is an exemplary block diagram illustrating a mobile device implementing the personalized digital assistant.

Referring to FIG. 6, an exemplary block diagram illustrating a mobile device implementing the personalized digital assistant is depicted. Mobile device 602 may be any mobile computing device, including, without limitation, a mobile phone, personal digital assistant (PDA), tablet, laptop, wearable computing device, or any other suitable mobile device. In one example, mobile device 602 may be one illustrative example of computing device 202 in FIG. 2.

Mobile device 602 provides an exemplary operation of a digital assistant mining activity logs, analyzing signals generated by device resources and stored in the activity logs, identifying areas of interest for further learning opportunities, and initiating a natural language conversation using generated questions related to the identified areas of interest. In this depicted example, the digital assistant identifies GPS coordinates associated with a date and time, and uses other resources to identify an entity associated with the coordinates and/or timestamp information. In this example, the digital assistant identifies that the user spent a threshold amount of time at Restaurant A on Mar. 31, 2015, generates an inference that the user ate at Restaurant A, and based on that inference generates a question: "It looks like you ate at Restaurant A last Tuesday; how did you like it?" This question may be presented or output by the digital assistant via a natural language conversation with the user initiated by the digital assistant.

In these examples, the generated question may have been stored in a learning queue, and once a threshold is reached for the learning queue, the digital assistant may retrieve the questions from the learning queue for use in the learning session with the user.

ADDITIONAL EXAMPLES

In some examples, the natural language conversation is a one-on-one conversation between the digital assistant and the user. The conversation is driven by the digital assistant, using the generated questions and adapting its responses during the conversation based on the user input received. The digital assistant uses these learning sessions to obtain user feedback on specifically identified topics or areas of user interaction that the digital assistant has developed an interest in refining. This enables the digital assistant to build its personalized user profile or user preference knowledge base without requiring the user to manually input settings or preferences, and without the user having to proactively identify areas where the digital assistant may improve. In other words, the digital assistant is proactively identifying areas for its own improvement without prompting by the user, and extracts the feedback used to confirm inferences and learn more about the user and user preferences via a natural language conversation. The digital assistant develops a bond with the user, a personal connection that is unique to its user, through refining its personalized knowledge base about the user. Additionally, by identifying targeted sentiment and adapting responses to address the identified sentiment, the digital assistant develops a personality that is complimentary to its user. The digital assistant builds awareness of a user's preferences and interests without user-driven input or configuration, and with minimal effort on the part of the user.

In an example scenario, the digital assistant develops a personalized user profile directed towards the unique interests of that user through targeted learning based on user activity and learning sessions. For example, the digital assistant may identify that the user is a fan of a specific sports team based on information minded from activity logs, such as browser history (searching for game times of that team), images captured (photo captured of a person wearing a team jersey), textual input (text/email with words identifying a specific sports team present multiple times in the course of user activity history). The digital assistant goes beyond identifying the inference that the user is a fan of the sports team, initiating a conversation with the user to confirm that inference, with a question directed towards the inference. As an example, "I see you are tracking Football Team A, would you like me to add their game schedule to your personal calendar?"

As another example scenario, the digital assistant could ask a more general question directed towards learning what the user's preferences are in relation to an inference. As an example, "I see you are tracking the Football Team A and you follow some other sports teams. What's one thing I can do better in this domain?" The user could then provide a specific request or feedback unique to that user's desired preference in relation to their sports interests. For example, the user may ask if college football will be available soon. The digital assistant may log that request or response received from the user during the conversation as part of the user profile, perhaps indicating the user has an interest in college football. In addition, the digital assistant may create a task, such as adding college football tracking to the list of digital assistant tasks performed for that user. As another example, the digital assistant may log the request and create a task reminder associated with the request that is dependent upon the digital assistant gaining that functionality in the future, such as a scenario where the requested functionality is not yet available (e.g. the college football season has not yet started). The digital assistant not only learns more about the user preferences, but refines its ability to make better, more accurate inferences in the future. Additionally, the digital assistant may close the feedback loop with the user, being responsive to the user during the conversation or once the task has been created and/or completed. For example, the digital assistant may respond during the conversation to close the feedback loop, such as "Okay, I've added college football tracking like you asked!" In another example, the digital assistant may respond to close the feedback loop once the functionality is available.

Alternatively or in addition to the other examples described herein, examples include any combination of the following:

- maintain one or more questions in a learning queue;
- determine whether a number of stored questions in the learning queue has reached a threshold;
- initiate a learning session responsive to determining that the threshold has been reached;
- generate one or more inferences related to user preferences based on the activity logs;
- generate at least one question directed towards confirming at least one of the one or more generated inferences;
- generate a response during the learning session based at least in part on the identified sentiment;
- label the at least one facet identified in the user input according to the identified sentiment;
- update the user profile with the labeled facet;
- generate one or more inferences related to user preferences based on the activity logs;
- generate at least one question directed towards a task associated with the at least one inference;
- generating one or more signals corresponding to at least one location associated with at least one user device, the one or more signals stored in the activity logs;
- process the one or more signals to identify the one or more areas of desired feedback;
- generating one or more signals corresponding to browser history associated with at least one user device, the one or more signals stored in the activity logs;
- generating one or more signals corresponding to text input associated with at least one user device, the one or more signals stored in the activity logs;
- generating one or more signals corresponding to at least one captured image, the one or more signals stored in the activity logs;
- generating one or more signals corresponding to at least one user-initiated task failure, the one or more signals stored in the activity logs;
- maintaining the one or more queries in a learning queue;
- determining whether a number of stored queries in the learning queue has reached a threshold;
- initiating the natural language conversation responsive to determining that the threshold has been reached;
- performing sentiment analysis on the user input during the natural language conversation;
- identifying sentiment directed towards a facet of at least one of the one or more queries;
- generating a response to the user input during the natural language conversation of the natural language conversation using the identified sentiment;
- processing the activity logs, including performing keyword recognition on at least one of browser history data, text messaging data, electronic messaging data, or social media application data;
- processing the activity logs, including identifying one or more locations corresponding to a computing device location history using global positioning system data associated with the computing device and a search engine;
- processing the activity logs, including identifying at least one failed user-initiated task.

The digital assistant may maintain one or more questions in a learning queue and periodically determine whether a number of stored questions in the learning queue has reached a threshold amount. When the threshold is met, the digital assistant may initiate a learning session as a natural language conversation to elicit feedback to the one or more questions.

In some examples, the digital assistant may generate one or more inferences related to user preferences based on activity logs, and use these inferences to generate some questions or to identify areas where further learning is desired. The digital assistant may also generate a response during the learning session based in part on targeted sentiment identified in user feedback received during the natural language conversation. The identified target sentiment may also be used by the digital assistant to label one or more facets or facet items identified in user input or user feedback, and may also update a user profile with these labeled facets or labeled facet items to further personalize the digital assistant.

In some examples, the signals generated by resources of a mobile computing device may be transmitted to the digital assistant or stored in activity logs accessible to the digital assistant for mining operations. As one example, if a GPS component of a mobile device transmits or records data indicating that the mobile device remained at a specific location for an amount of time, and the amount of time reaches a threshold that indicates some activity related to the location took place during that amount of time, the digital assistant may consider this an area for further learning. The GPS location information associated with the threshold of time may be used in combination with another device resource, such as a browser or search engine, to identify an entity (e.g. a place or event) corresponding to the location information. As an example, if the location information corresponded to an entertainment venue, and the timestamp associated with the location information corresponded to a specific event, the digital assistant may identify that a learning opportunity exists with relation to the user's experience at that event. The digital assistant may generate questions accordingly, such as "I see you attended the Concert last Friday; how did you like the music?" or "I see you attended the Sporting Event yesterday; which team were you cheering for?" Generating questions geared towards digging into the user's preferences based upon past activity allows the digital assistant to proactively personalize itself to user preferences and interests. The leads to more accurate inferences made by the digital assistant in the future, as well as developing a personal connection between the digital assistant and the user.

As another example, browser history may be mined by the digital assistant to identify user interests or other areas of desired feedback for the digital assistant. Pattern recognition, keyword recognition, subject matter recognition, or any suitable type of recognition algorithm may be employed by the digital assistant to identify areas for further learning through one-on-one, natural language conversations. These techniques may also be used by the digital assistant when mining electronic messages, text messages, or other social media posts or updates generated by the user and accessible to the digital assistant for reflection. Processing the activity logs may include performing keyword recognition on at least one of browser history data, text messaging data, electronic messaging data, or social media application data, in these examples. Processing the activity logs may also include identifying one or more locations corresponding to a computing device location history using global positioning system data associated with the computing device and a search engine, in these examples. In some other examples, processing the activity logs may include detecting one or more images captured by a camera associated with the computing device and identifying at least one entity (e.g. person, place, thing, or event) in at least one of the one or more images. Processing the activity logs may also include identifying at least one failed user-initiated task, in some examples.

The digital assistant may also use collaborative filtering to guide what questions are asked. For example, if the digital assistant already knows its user is a vegetarian, the digital assistant may compare other user profiles of vegetarians and their associated user activity logs to identify restaurants preferred by the other users. The other user profiles may be accessed by the digital assistance via a database, cloud service, or any other data source accessible to the digital assistant. The digital assistant may use the information learned via collaborative filtering to generate questions for a learning session, such as whether or not the user enjoys a certain type of cuisine associated with highly rated restaurants preferred by other vegetarians, for example.

At least a portion of the functionality of the various elements in FIG. 2 may be performed by other elements in FIG. 1, or an entity (e.g., processor, web service, server, application program, computing device, etc.) not shown in FIG. 1.

In some examples, the operations illustrated in FIG. 3-5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent. For example, users may selectively configure which resources, or which activity log data, the digital assistant is allowed to access and scan when forming inferences and generating questions for learning sessions Exemplary Operating Environment Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for developing a personal connection between a digital assistant and its user. For example, the elements illustrated in FIG. 1-2, such as when encoded to perform the operations illustrated in FIG. 3-5, constitute exemplary means for identifying areas of interest associated with user activity, exemplary means for obtaining user feedback associated with the identified areas of interest, and exemplary means for refining a personalized knowledge base corresponding to the user associated with the digital assistant.

Figure 7:
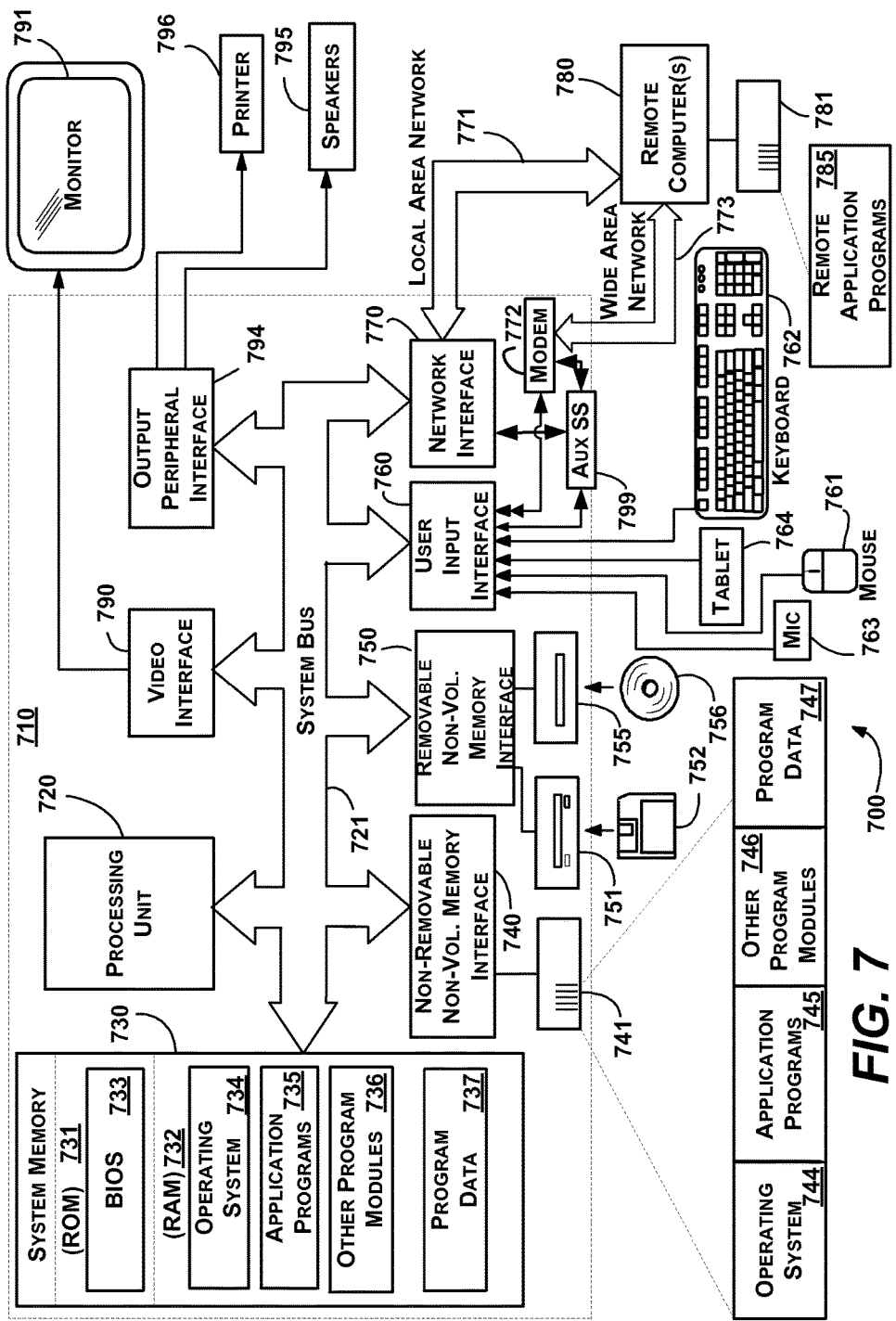
FIG. 7 shows an illustrative example of a computing environment into which various aspects of the present disclosure may be incorporated.

FIG. 7 illustrates an example of a suitable computing and networking environment 700 on which the examples of FIGS. 1-5 may be implemented. The computing system environment 700 is only one example of a suitable computing environment and is not intended to suggest any limitation as to the scope of use or functionality of the disclosure. Neither should the computing environment 700 be interpreted as having any dependency or requirement relating to any one or combination of components illustrated in the exemplary operating environment 700.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the disclosure may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components may either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel may be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device.

By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for personalizing a digital assistant, the system comprising:
   a processing unit;
   a memory communicatively coupled to the processing unit, the memory maintaining activity logs corresponding to one or more computing device components of one or more user devices; and
   the digital assistant, executed by the processing unit, the digital assistant further executed to:
   analyze at least one user activity of logged user activities from the activity logs maintained in the memory, the logged user activities based on signals generated via the one or more computing device components of the one or more user devices;
   generate one or more inferences related to user preferences based on the analyzed at least one user activity of logged user activities from the activity logs;
   generate at least one question directed towards confirming at least one generated inference of the one or more generated inferences;
   store the at least one generated question in a learning queue;

determine whether the learning queue has reached a threshold number of stored questions;
responsive to determining that the learning queue has reached the threshold number of stored questions, trigger a learning session associated with personalizing the digital assistant by presenting one or more questions from the learning queue via a natural language conversation;
receive a user input during the learning session responsive to the one or more questions;
identify a sentiment associated with at least one facet of the received user input; and
update a user profile based on the received user input and the identified sentiment of the received user input to confirm or deny the at least one generated inference.

2. The system of claim 1, wherein the one or more computing device components include at least one of a global positioning system, an Internet browser, a sentiment classifier, an electronic messaging client, a text messaging client, a camera, an error log, or a personalized knowledge base.

3. The system of claim 1 wherein the digital assistant is further executed to:
generate a response during the learning session based at least in part on the identified sentiment.

4. The system of claim 1 wherein the digital assistant is further executed to:
label the at least one facet of the received user input according to the identified sentiment; and
update the user profile with the labeled facet.

5. The system of claim 1, wherein the threshold is a number of areas of interest having at least one corresponding generated question.

6. The system of claim 1, wherein the trigger is further based on detected user inactivity.

7. The system of claim 1, wherein the trigger is further based on time identified in a user's schedule as free time.

8. A mobile device comprising:
a processing unit;
a memory communicatively coupled to the processing unit; and
a digital assistant executed by the processing unit to:
process activity logs maintained on the memory to identify one or more areas of desired feedback associated with one or more inferences developed at the digital assistant based on the activity logs, the activity logs being configured to store at least one activity of a user based on signals generated via one or more computing device components of the mobile device;
generate one or more questions directed towards confirming the one or more inferences developed at the digital assistant corresponding to the one or more areas of desired feedback;
store the generated one or more questions in a learning queue;
determine whether the learning queue has reached a threshold number of stored questions;
responsive to determining that the learning queue has reached the threshold number of stored questions, trigger a learning session associated with the one or more inferences developed at the digital assistant via a natural language conversation based on the one or more generated questions stored in the learning queue;
receive user input during the natural language conversation responsive to the one or more questions;
identify a sentiment associated with at least one facet of the received user input;
confirm or deny at least one inference of the one or more inferences developed at the digital assistant based on the received user input and the identified sentiment; and
perform at least one task related to a user preference based on the at least one confirmed or denied inference.

9. The mobile device of claim 8 wherein the digital assistant is further executed to:
generate one or more other inferences related to user preferences based on the activity logs; and
generate at least one question directed towards a task associated with at least one of the one or more other inferences.

10. The mobile device of claim 8 further comprising:
a global positioning system generating one or more signals corresponding to at least one location associated with the mobile device, the one or more signals stored in the activity logs; and
the digital assistant further executed to process the one or more signals to identify the one or more areas of desired feedback.

11. The mobile device of claim 8 further comprising:
a browser executed by the processing unit, the browser generating one or more signals corresponding to browser history associated with the mobile device, the one or more signals stored in the activity logs; and
the digital assistant further executed to process the one or more signals to identify the one or more areas of desired feedback.

12. The mobile device of claim 8 further comprising:
an electronic messaging client executed by the processing unit, the electronic messaging client generating one or more signals corresponding to a text input associated with the mobile device, the one or more signals stored in the activity logs; and
the digital assistant further executed to process the one or more signals to identify the one or more areas of desired feedback.

13. The mobile device of claim 8 further comprising:
a camera generating one or more signals corresponding to at least one captured image, the one or more signals stored in the activity logs; and
the digital assistant further executed to process the one or more signals to identify the one or more areas of desired feedback.

14. The mobile device of claim 8 further comprising:
an error log generating one or more signals corresponding to at least one user-initiated task failure, the one or more signals stored in the activity logs; and
the digital assistant further executed to process the one or more signals to identify the one or more areas of desired feedback.

15. A method for digital assistant personalization, the method comprising:
analyzing at least one user activity from logged user activities of activity logs maintained in a memory of a computing device, the logged user activities based on signals generated via one or more computing device components of the computing device;
generating one or more inferences related to user preferences based on the analyzed at least one user activity of logged user activities from the activity logs;

generating at least one question directed towards confirming at least one generated inference of the generated one or more inferences to personalize the digital assistant to a user of the computing device based on the one or more generated inferences from the activity logs;

storing the generated at least one question in a learning queue;

determining whether the learning queue has reached a threshold number of stored questions;

responsive to determining that the learning queue has reached the threshold number of stored questions, triggering, by the digital assistant, a machine learning session via a natural language conversation between the digital assistant and the user of the computing device using the number of stored questions in the learning queue;

receiving a user input during the natural language conversation in response to the number of stored questions;

identifying sentiment associated with at least one facet of the received user input; and updating a personalized profile associated with the user based on the received user input and the identified sentiment to confirm or deny the at least one generated inference in order to personalize the digital assistant.

16. The method of claim 15 further comprising:
generating a response to the user input during the natural language conversation of the natural language conversation based at least in part on the identified sentiment.

17. The method of claim 15 wherein generating the at least one question further comprises:
processing the activity logs, including performing a keyword recognition on at least one of browser history data, text messaging data, electronic messaging data, or social media application data.

18. The method of claim 15 wherein generating the at least one question further comprises:
processing the activity logs, including identifying one or more locations corresponding to a computing device location history using a global positioning system data associated with the computing device and a search engine.

19. The method of claim 15 wherein generating the at least one question further comprises:
processing the activity logs, including detecting one or more images captured by a camera associated with the computing device and identifying at least one entity in at least one of the one or more images.

20. The method of claim 15 wherein generating the at least one question further comprises:
processing the activity logs, including identifying at least one failed user-initiated task.

* * * * *